(12) United States Patent
Sako (10) Patent No.: US 7,792,005 B2
(45) Date of Patent: Sep. 7, 2010

(54) OPTICAL PICKUP APPARATUS

(75) Inventor: Shinichi Sako, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 497 days.

(21) Appl. No.: 11/802,533

(22) Filed: May 23, 2007

(65) Prior Publication Data

US 2007/0274189 A1 Nov. 29, 2007

(30) Foreign Application Priority Data

May 26, 2006 (JP) .............................. 2006-147457

(51) Int. Cl.
G11B 7/135 (2006.01)
(52) U.S. Cl. .............................. 369/112.05; 369/112.01; 369/112.1; 369/112.15; 369/118
(58) Field of Classification Search ........................ None
See application file for complete search history.

(56) References Cited

U.S. PATENT DOCUMENTS

2005/0169152 A1* 8/2005 Miyake et al. ......... 369/112.15
2007/0177488 A1* 8/2007 Sugawara ................... 369/121

FOREIGN PATENT DOCUMENTS

| JP | 8-221788 | 8/1996 |
|----|----------|--------|
| JP | 10-208294 | 8/1998 |
| JP | 11-25496 | 1/1999 |
| JP | 11-344666 | 12/1999 |
| JP | 2005-216458 | 8/2005 |
| JP | 2005-228449 | 8/2005 |

* cited by examiner

Primary Examiner—Joseph H Feild
Assistant Examiner—Ifedayo Iluyomade
(74) Attorney, Agent, or Firm—Morrison & Foerster LLP (57) ABSTRACT

On an optical path between a light source and an objective lens, there is provided an optical path changing section for changing a predetermined optical path of undesired light passing through, from the predetermined optical path to another optical path. The optical path changing section includes a plate having an aperture portion for allowing a laser beam emitted from the light source to pass through, and an aperture wall which defines the aperture portion of the plate includes a taper portion which is formed in a tapered-shape and slants so as to come close to an optical axis L1 of the light source in association with movement toward a laser beam outgoing direction. The undesired light from the light source is reflected by the taper portion to change the predetermined optical path of the undesired light passing through, from the predetermined optical path to another optical path.

7 Claims, 6 Drawing Sheets

OPTICAL PICKUP APPARATUS

CROSS-REFERENCE TO RELATED APPLICATION

This application claims priority to Japanese Patent Application No. 2006-147457, which was filed on May 26, 2006, the contents of which, are incorporated herein by reference, in their entirety.

BACKGROUND OF THE INVENTION

1. Field of the invention

The present invention relates to an optical pickup apparatus that is preferably used when at least either a process of reading information recorded in an optical recording medium or a process of recording information onto the optical recording medium is performed.

2. Description of the related art

Figure 6:
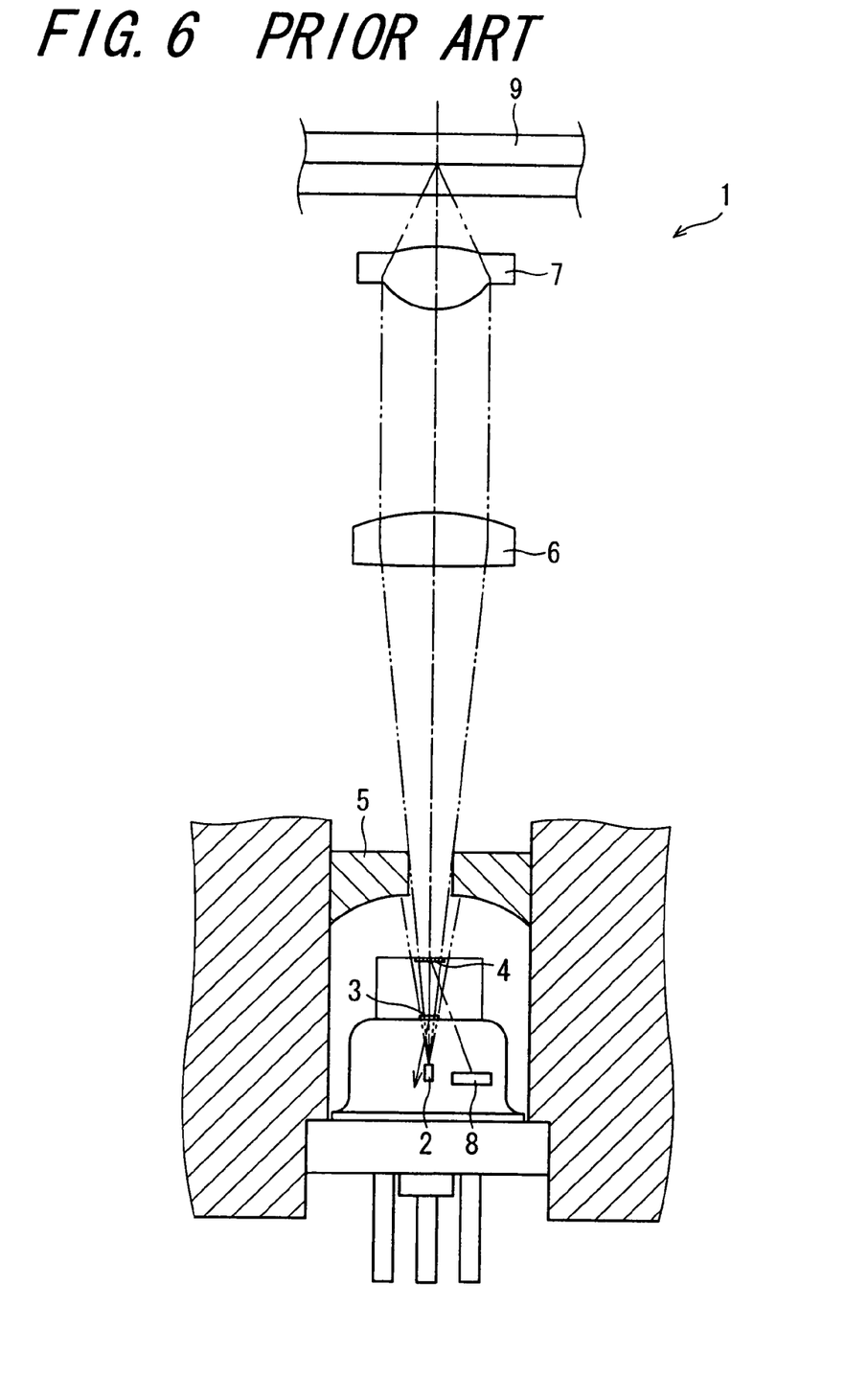
FIG. 6 is a view showing the configuration of an optical pickup apparatus according to the related art.

FIG. 6 is a view showing a configuration illustrating an optical pickup apparatus 1 according to the related art. The optical pickup apparatus 1 is constituted to include a light source 2, a beam splitting diffraction grating 3, a hologram diffraction grating 4, aperture limiting means 5, a collimating lens 6, an objective lens 7, and a photodetector 8. A laser beam emitted from the light source 2 is transmitted through the beam splitting diffraction grating 3, the hologram diffraction grating 4, and the aperture limiting means 5, and then transmitted through the collimating lens 6 and the objective lens 7, and condensed on an information recording surface of a disk-shaped optical recording medium (hereinafter referred to as an "optical recording medium") 9. The laser beam reflected by the information recording surface of the optical recording medium 9 is transmitted through the objective lens 7, the collimating lens 6, and the aperture limiting means 5, and then is diffracted by the hologram diffraction grating 4, and then enters the photodetector 8, to read a signal.

The optical pickup apparatus 1 is constituted by providing the aperture limiting means 5 so as to prevent reflected light reflected by optical components such as the collimating lens 6 and a laser beam that is not condensed on the information recording surface of the optical recording medium 9, of a laser beam emitted from the light source 2, from entering the photodetector 8. Technologies similar to such optical pickup apparatus 1 have been disclosed in for example Japanese Unexamined Patent Publication JP-A 10-208294 (1998), and Japanese Unexamined Patent Publication JP-A 11-344666 (1999).

An optical head apparatus disclosed in JP-A 10-208294 (1998) is constituted by providing aperture limiting means in a diffraction element so as to reduce amounts of diffracted light beams on an approach route which diffracted light beams are generated when a light beam emitted from a light source enters the diffraction element before reaching condensing optics, and to prevent the diffracted light beams on the approach route from entering an light-receiving element by being reflected by an optical recording medium.

An optical pickup disclosed in JP-A 11-344666 (1999) is constituted by providing, for example aperture limiting means between a beam splitting section for splitting two laser beams having different wavelengths and a laser/detector integrated unit, so as to remove flare which enters a light-receiving element.

In the optical pickup apparatus 1 as described above, the optical head apparatus in JP-A 10-208294, and the optical pickup in JP-A 11-344666, there arises a problem in which by providing the aperture limiting means, reflected light in a laser beam emitted from the light source is newly generated which is reflected on a surface facing the light source of the aperture limiting means and the reflected light enters the photodetector or the light-receiving element to serve as noise, thus preventing detection of a correct signal. Technologies to solve this problem have been disclosed in, for example JP-A 2005-216458 and JP-A 11-25496 (1999).

An optical pickup apparatus disclosed in JP-A 2005-216458 is constituted by providing a light shielding aperture in which an undesired light guide surface having a curved surface shape is formed to guide undesired light in another direction from a direction toward a photodetector, so as to guide the undesired light in another direction from a direction toward the photodetector and thus prevent the undesired light from entering the photodetector.

An optical pickup apparatus disclosed in JP-A 11-25496 is constituted by providing an aperture, on an optical base for arranging optical components including a light-receiving/light-emitting integral element, at a position on an output optical path from the light-receiving/light-emitting integral element, having an aperture having a diameter substantially identical to a necessary light flux diameter, and being constituted by a transparent thin plate composed of sheet metal, glass, or resin for shielding light out of the necessary light flux diameter, so as to suppress or prevent stray light around a signal-detecting/light-receiving region of a photodetector. In addition, the optical head is constituted by providing, in the light-receiving/light-emitting integral element, an aperture region for transmitting only a necessary light flux to a light incoming/outgoing surface, and by further providing, in a region other than the aperture region, various kinds of antireflection, scatter reflection absorption, or light absorption functions, such as addition of an antireflection coating, satin finish treatment, or the like, so as to further reduce the stray light around the signal-detecting/light-receiving region.

The optical pickup apparatus disclosed in JP-A 2005-216458 is constituted by providing the light shielding aperture in which the undesired light guide surface is formed, so as to guide the undesired light in another direction from a direction toward the photodetector. However, it is difficult to prevent a portion of a laser beam out of an effective diameter of an objective lens and having relatively high light intensity, from entering a hologram diffraction grating and the photodetector. And when the laser beam reflected by an optical recording medium once enters the hologram diffraction grating, the laser beam tends to enter the photodetector. Accordingly, there arises a problem that a correct signal cannot be detected.

Furthermore, in the optical pickup apparatus disclosed in JP-A 2005-216458, it is necessary to achieve a high-accuracy positioning of aperture limiting means from a light source, resulting that it is difficult to assemble and adjust the optical pickup apparatus. Accordingly, there has been arisen a problem in which it is difficult to improve productivity of the optical pickup apparatus, thus increasing manufacturing costs thereof.

Further, when various kinds of antireflection, scatter reflection absorption, or light absorption functions, such as addition of an antireflection coating, satin finish treatment, or the like, are provided in a region other than the aperture region of the signal-detecting/light receiving region, as an optical head disclosed in JP-A 11-25496, reflected light can be reduced, but cannot be prevented completely. Therefore, there arises a problem in which the reflected light enters the photodetector, thus preventing detection of a correct signal.

SUMMARY OF THE INVENTION

An object of the invention is to provide an optical pickup apparatus capable of preventing undesired light from entering an photodetector, and of detecting a correct signal.

The invention provides an optical pickup apparatus for carrying out at least either a process of reading information recorded in the optical recording medium or a process of reading information onto the optical recording medium by irradiating an optical recording medium with a laser beam, the apparatus comprising:

a light source for emitting a laser beam having a predetermined wavelength range;

a light-condensing section for condensing the laser beam emitted from the light source on the optical recording medium;

a light-detecting section for detecting the laser beam emitted from the light source and reflected by the optical recording medium; and an optical path changing section provided on an optical path between the light source and the light-condensing section, for changing a predetermined optical path of undesired light other than the laser beam to be applied for reading or recording of information from/onto the optical recording medium, of the laser beam emitted from the light source, from the predetermined optical path to another optical path;

wherein the optical path changing section includes a plate having an aperture portion for allowing the laser beam emitted from the light source to pass through, and an aperture wall which defines the aperture portion of the plate includes a taper portion which is formed in a tapered-shape and slants so as to come close to an optical axis line of the light source in association with movement toward a laser beam outgoing direction.

According to the invention, the optical path changing section is provided on the optical path between the light source and the light-condensing section, for changing the predetermined optical path of the undesired light other than the laser beam to be applied for reading or recording information from/onto the optical recording medium, of the laser beam emitted from the light source, from the predetermined optical path to another optical path. The optical path changing section includes the plate in which the aperture portion is formed for allowing the laser beam emitted from the light source to pass through. The aperture wall which defines the aperture portion of the plate includes the taper portion which is formed in a tapered-shape and slants so as to come close to an optical axis line of the light source in association with movement toward a laser beam outgoing direction.

Therefore, the undesired light other than the laser beam emitted from the light source and to be applied for reading or recording information from/onto the optical recording medium is reflected by the optical path changing section, specifically, the taper portion which defines the aperture wall of the aperture portion in the plate, resulting in that the predetermined optical path of the undesired light passing through is changed from the predetermined optical path to another optical path. Therefore, the undesired light can be prevented from entering the light-detecting section by being reflected by the optical recording medium, for example. Therefore, it is possible to detect correct signals, for example, a focusing error signal, a tracking error signal, and an information signal, based on a detected result of the light-detecting section for detecting a laser beam that has been reflected by the optical recording medium. Accordingly, it is possible to carry out correct reading from information recorded in the optical recording medium and correct recording of information onto the optical recording medium.

Further, in the invention, it is preferable that a dimension of a part of the taper portion having a smallest aperture cross section is smaller than a dimension of a cross section of a laser beam, the cross section being taken on a virtual plane perpendicular to an optical axis line at a position where the laser beam emitted from the light source has reached the aperture wall.

According to the invention, a dimension of a part of the taper portion having a smallest aperture cross section is smaller than a dimension of a cross section of a laser beam, the cross section being taken on a virtual plane perpendicular to an optical axis line at a position where the laser beam emitted from the light source has reached the aperture wall. Accordingly, in the laser beam emitted from the light source, a laser beam to be applied for reading or recording of information from/onto the optical recording medium is directly passed through the aperture portion of the plate, and only the undesired light other than the laser beam is reflected by the taper portion of the aperture wall which defines the aperture portion. Accordingly, the predetermined optical path of the undesired light passing through can be certainly changed from the predetermined optical path to another optical path.

Accordingly, the undesired light can be prevented from entering the light-detecting section by being reflected by for example the optical recording medium. Therefore, it is possible to detect correct signals, for example, a focusing error signal, a tracking error signal, and an information signal, based on a detected result of the light-detecting section for detecting a laser beam that has been reflected by the optical recording medium. Therefore, it is possible to carry out correct reading from information recorded in the optical recording medium and correct recording of information onto the optical recording medium.

Further, in the invention, it is preferable that a dimension of a part of the taper portion having a largest aperture cross section is larger than a dimension of a cross section of a laser beam emitted from the light source, the cross section of the laser beam being taken on a virtual plane perpendicular to the optical axis line at a position corresponding to the part of the taper portion having the largest aperture cross section.

According to the invention, a dimension of a part of the taper portion having a largest aperture cross section is larger than a dimension of a cross section of a laser beam emitted from the light source, the cross section of the laser beam being taken on a virtual plane perpendicular to the optical axis line at a position corresponding to the part of the taper portion having the largest aperture cross section. Accordingly, the entire laser beam emitted from the light source can be guided to the aperture portion of the plate, and then the laser beam to be applied for reading or recording of information from/onto the optical recording medium in the laser beam emitted from the light source, is directly passed through the aperture portion of the plate, and only the undesired light other than the laser beam is reflected by the taper portion of the aperture wall which defines the aperture portion. Accordingly, the predetermined optical path of the undesired light passing through can be certainly changed from the predetermined optical path to another optical path.

Accordingly, the undesired light can be prevented from entering the light-detecting section by being reflected by for example the optical recording medium. Therefore, it is possible to detect correct signals, for example, a focusing error signal, a tracking error signal, and an information signal, based on a detected result of the light-detecting section for detecting a laser beam that has been reflected by the optical recording medium. Accordingly, it is possible to carry out correct reading from information recorded in the optical recording medium and correct recording of information onto the optical recording medium.

Further, in the invention, it is preferable that the aperture wall includes a function for reflecting the undesired light into a space facing the part of the taper portion having the smallest aperture cross section.

According to the invention, the aperture wall includes a function for reflecting the undesired light into a space facing the part of the taper portion having the smallest aperture cross section, the undesired light in the laser beam emitted from the light source being a laser beam other than the laser beam to be applied for reading or recording of information from/onto the optical recording medium. Therefore, the undesired light in the laser beam emitted from the light source is reflected into a space facing the part of the taper portion having the smallest aperture cross section, by the taper portion of the aperture wall in the plate.

Accordingly, the undesired light can be prevented from entering the light-detecting section by being reflected by for example the optical recording medium. Therefore, it is possible to detect correct signals, for example, a focusing error signal, a tracking error signal, and an information signal, based on a detected result of the light-detecting section for detecting a laser beam that has been reflected by the optical recording medium. Accordingly, it is possible to carry out more correct reading from information recorded in the optical recording medium and more correct recording of information onto the optical recording medium.

Further, in the invention, it is preferable that two or more light sources are provided, each of which emits a laser beam having a wavelength range, the respective wavelength ranges being different from each other.

According to the invention, the optical pickup apparatus further comprises the two or more light sources, each of which emits a laser beam having a wavelength range, the respective wavelength ranges being different from each other. Even in the case where the optical pickup apparatus comprises the two or more light sources, in the laser beam emitted from each of the light sources, the laser beam to be applied for reading or recording of information from/onto the optical recording medium is directly passed through the aperture portion of the plate, and only the undesired light other than the laser beam is reflected by the taper portion of the aperture wall which defines the aperture portion. Accordingly, the predetermined optical path of the undesired light passing through can be certainly changed from the predetermined optical path to another optical path.

Accordingly, the undesired light from each of the light sources can be prevented from entering the light-detecting section by being reflected by for example the optical recording medium. Therefore, it is possible to detect correct signals, for example a focusing error signal, a tracking error signal, and an information signal, based on a detected result of the light-detecting section for detecting a laser beam that has been emitted from each light source and reflected by the optical recording medium. Accordingly, it is possible to carry out correct reading from information recorded in the optical recording medium and correct recording of information onto the optical recording medium.

Further, in the invention, it is preferable that the plate is composed of a resin material.

Further, according to the invention, the plate can be implemented by a resin material. Therefore, it is possible to achieve further reductions in weight and manufacturing costs for the optical pickup apparatus, compared with a case in which the plate is implemented by a metal material.

Further, in the invention, it is preferable that the optical pickup apparatus further comprises a laser unit having a light source and a diffraction section for diffracting a laser beam emitted from the light source; and a housing for supporting a main body of the optical pickup apparatus, wherein the optical path changing section is integrally constituted with the laser unit or the housing.

According to the invention, the optical path changing section is integrally constituted with the laser unit having the light source and the diffraction section for diffracting the laser beam emitted from the light source, or the housing which supports the main body of the optical pickup apparatus. Accordingly, it is possible to reduce a number of optical components and a number of assembling processes thereof, simplify optical adjustment work such as an optical axis adjustment, and assembling work, and thereby improve productivity of the optical pickup apparatus. In addition, by reducing a number of the optical components, it is possible to achieve further reductions in weight and manufacturing costs for the optical pickup apparatus.

Further, even after adjustments for a position of the light source from the light-condensing section, or the like, it is possible to detect correct signals, for example the focusing error signal, the tracking error signal, and the information signal, based on a detected result of the light-detecting section for detecting a laser beam that has been emitted from each light source and reflected by the optical recording medium. Accordingly, it is possible to carry out correct reading from information recorded in the optical recording medium and correct recording of information onto the optical recording medium.

Further, in the invention, it is preferable that a cross-sectional shape of the part of the taper portion having the largest aperture cross section is any one of a circular shape, an elliptical shape, and a long hole shape.

Further, according to the invention, the cross-sectional shape of the part of the taper portion having the largest aperture cross section can be implemented by any one of a circular shape, an elliptical shape, and a long hole shape. Therefore, the cross-sectional shape is formed in any one of a circular shape, an elliptical shape, and a long hole shape, depending on a radiation angle of the laser beam emitted from the light source. Therefore, only the undesired light in the laser beam emitted from the light source is reflected by the taper portion of the aperture wall which defines the aperture portion. Accordingly, the predetermined optical path of the undesired light passing through can be certainly changed from the predetermined optical path to another optical path.

Accordingly, the undesired light from each of the light sources can be prevented from entering the light-detecting section by being reflected by for example the optical recording medium. Therefore, it is possible to detect correct signals, for example the focusing error signal, the tracking error signal, and the information signal, based on a detected result of the light-detecting section for detecting a laser beam that has been reflected by the optical recording medium. Accordingly, it is possible to carry out correct reading from information recorded in the optical recording medium and correct recording of information onto the optical recording medium.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention are described below.

Hereinafter, a plurality of embodiments of the invention will be described. In the following description, structures corresponding to those that have been described in preceding embodiments may be denoted by the same reference numerals and the overlapped description may be omitted. When only a portion of a component is described, the other portions of the component are regarded as being identical to those of the embodiments that have been described.

Figure 1:
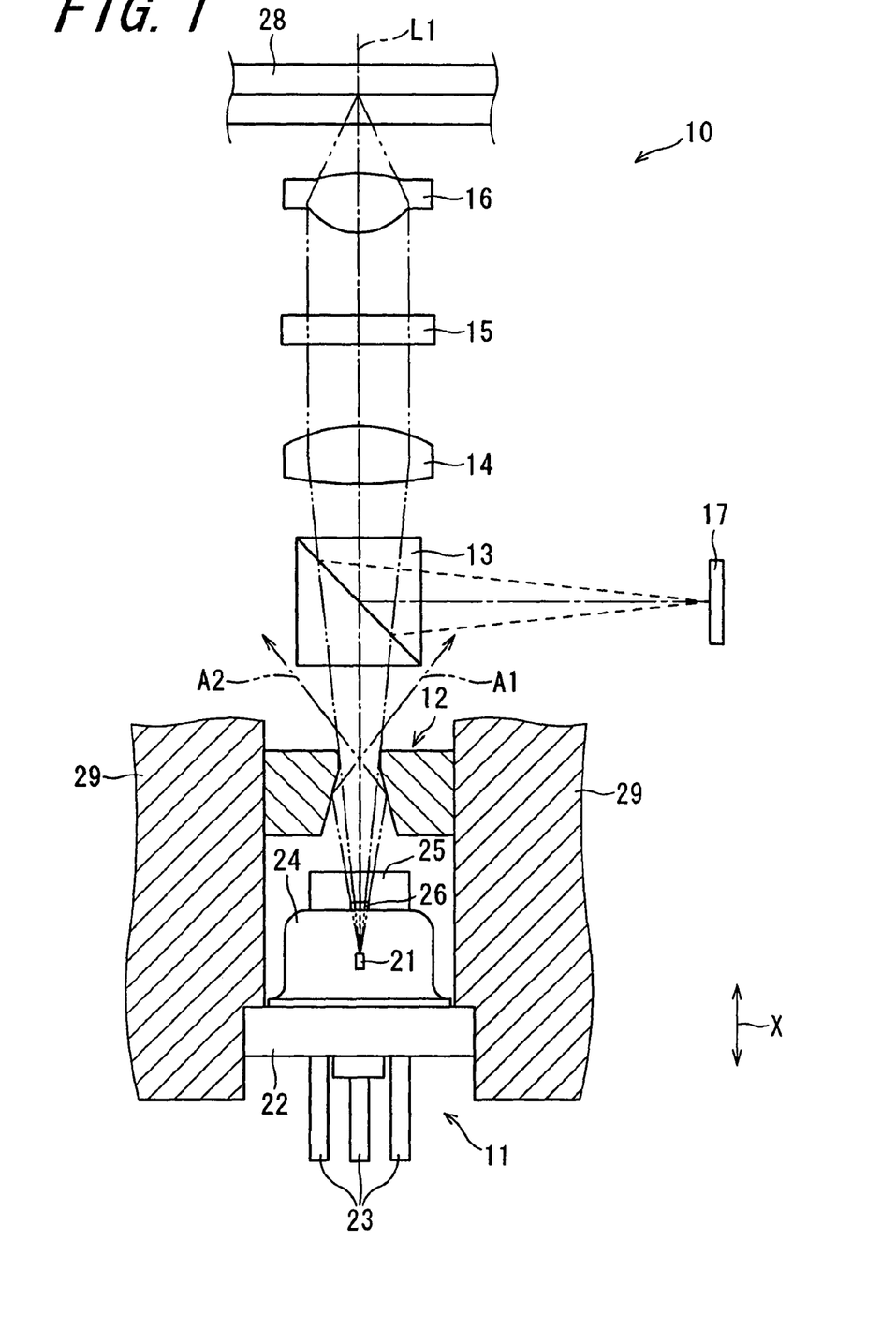
FIG. 1 is a view showing a configuration of an optical pickup apparatus according to one embodiment of the invention.
Figure 2:
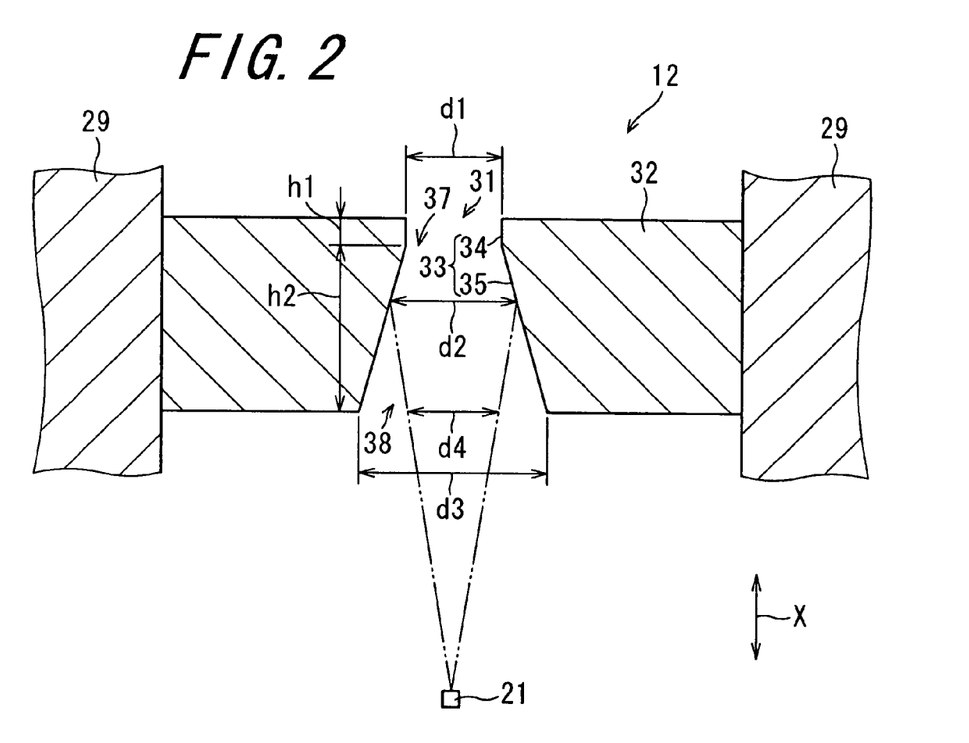
FIG. 2 is an enlarged cross-sectional view illustrating an optical path changing section.

FIG. 1 is a view showing a configuration of an optical pickup apparatus 10 according to one embodiment of the invention. FIG. 2 is an enlarged cross-sectional view illustrating an optical path changing section 12. By irradiating an optical desk-shaped recording medium (hereinafter simply referred to as an "optical recording medium") 28, such as compact disks (abbreviated as "CDs") and digital versatile disks (abbreviated as "DVDs"), with a laser beam emitted from a light source, the optical pickup apparatus 10 performs at least either a process of reading information recorded in the optical recording medium 28 or a process of recording information onto the optical recording medium 28. The optical recording medium 28 is, for example CD, CD-R (Compact Disk-Recordable), CD-RW (Compact Disk-Rewritable), DVD, DVD-R (Digital Versatile Disk-Recordable), and DVD-RAM (Digital Versatile Disk-Random Access Memory).

The optical pickup apparatus 10 comprises a laser unit 11, an optical path changing section 12, a prism 13, a collimating lens 14, a quarter wavelength plate 15, an objective lens 16, and photodetector 17. The laser unit 11 includes a light source 21, a stem 22, lead electrodes 23, a cap 24, and an optical substrate 25. The optical substrate 25 includes a beam splitting diffraction grating 26.

The light source 21 is implemented by, for example, a semiconductor laser element. When reading of information recorded in the optical recording medium 28 such as a CD-R and a CD-R/RW or recording of information onto such optical recording medium 28 is performed, the semiconductor laser element for emitting a laser beam having, for example, an infrared wavelength of 780 nm as a predetermined wavelength range (hereinafter may be referred to as a "CD semiconductor laser element"), is used as the light source 21. In addition, when reading of information recorded in the optical recording medium 28 such as a DVD-R and a DVD-RAM or recording of information onto such optical recording medium 28 is performed, a semiconductor laser element for emitting a laser beam having for example a red wavelength of 650 nm as a predetermined wavelength range (hereinafter may be referred to as a "DVD semiconductor laser element"), is used as the light source 21. Here, a direction parallel to an optical axis L1 of the light source 21 is taken as an X axis direction, and the X axis direction is denoted as "X" in FIGS. 1 and 2.

The light source 21 is arranged on one surface of a heat sink (not shown) in a thickness direction of the heat sink. The heat sink is provided on one surface of the stem 22 in a thickness direction thereof, in other words, on a surface of the stem 22 on one side in the X axis direction, wherein the stem is formed in the form of a plate. The lead electrodes 23 are provided so as to be projected from the other surface of the stem 22 in the thickness direction thereof, in other words, a surface of the stem 22 on the other side in the X axis direction, on the other side in the X axis direction that is the other side in the thickness direction of the stem 22, and are electrically connected to the light source 21. A driving voltage and a driving current are supplied to the light source 21 via the lead electrodes 23 to cause an emission of a laser beam having a predetermined wavelength range from the light source 21.

The cap 24 is a sealing member for sealing the light source 21 in order to prevent physical contact between the light source 21 and the outside, and is attached to the one surface of the stem 22 in the thickness direction thereof, in other words, on the surface of the stem 22 on the one side in the X axis direction. Thus, the light source 21 is hermetically sealed by the stem 22 and the cap 24. The optical substrate 25 formed in the form of a rectangular parallelepiped is mounted on one surface of the cap 24 perpendicular to the optical axis L1. The beam splitting diffraction grating 26 is formed on one surface of the optical substrate 25 in a thickness direction thereof, in other words, on a surface of the optical substrate 25 on the other side in the X axis direction. The beam splitting diffraction grating 26 diffracts a laser beam emitted to split into transmitted light (hereinafter may be referred to as "zero-order light beam") as one main beam, and +/− first-order diffracted light beams as two sub-beams.

The optical path changing section 12 is arranged on an optical path between the laser unit 11 having the light source 21, and the objective lens 16 as described later, in more detail, on an optical path between the laser unit 11 and the prism 13 as described later. The optical path changing section 12 is a section for changing a predetermined optical path through which undesired light in a laser beam emitted from the light source 21 passes, from the predetermined optical path to another optical path. Here, the undesired light is a laser beam on the outer circumference side of an effective diameter in a radial direction of the laser beam (hereinafter referred to as a "laser beam out of the effective diameter"), and is a laser beam other than a laser beam to be applied for reading or recording of information from/onto the optical recording medium 28. Herein, the effective diameter represents a diameter dimension of a laser beam which effectively enters the objective lens 16.

The optical path changing section 12 is integrally constituted with a sliding base 29 corresponding to a housing for supporting a main body of the optical pickup apparatus. The optical path changing section 12 is implemented by a resin material such as polycarbonate (abbreviated as PC) resin, acrylonitrile-butadiene-styrene copolymer (abbreviated as ABS) resin, polyphenylene sulfide (abbreviated as PPS) resin, or liquid crystal polymer (abbreviated as LCP) resin.

The optical path changing section 12 includes a plate 32 in which an aperture portion 31 is formed. The aperture portion 31 opens on both sides in the X axis direction, and allows a laser beam emitted from the light source 21 to pass therethrough. An aperture wall 33 which defines the aperture portion 31 in the plate 32 includes a flat portion 34 formed in parallel to the optical axis L1 of the light source 21, in other words, in parallel to the X axis direction, and a taper portion 35 which is formed in a tapered-shape and slants so as to come close to the optical axis L1 of the light source 21 in association with movement on one side of the X axis direction as a laser beam outgoing direction.

In the embodiment, a length dimension h1 of the flat portion 34 is selected to be around 0.3 mm, and a height dimension h2 of a virtual right triangle having a hypotenuse of the taper portion 35 in parallel to the X axis direction is selected to be around 1.5 mm.

In the plate 32, a dimension d1 of a part 37 of the taper portion 35 having the smallest aperture cross section is smaller than a dimension d2 of a cross section of a laser beam, the cross section being taken on a virtual plane perpendicular to the X axis direction at a position where the laser beam emitted from the light source 21 has reached the aperture wall 33. The dimension d1 of the embodiment is selected to be a diameter of around 1 mm, and the dimension d2 is selected to be a diameter of around 1.4 mm.

The aperture wall 33 which defines the aperture portion 31 of the plate 32 includes a function for reflecting the undesired light into a space facing the part 37 of the taper portion 35 having the smallest aperture cross section.

In the plate 32, a dimension d3 of a part 38 of the taper portion 35 having the largest aperture cross section is larger than a dimension d4 of a cross section of a laser beam emitted from the light source 21, the cross section of the laser beam being taken on a virtual plane perpendicular to the X axis direction at a position corresponding to the part 38 of the taper portion 35 having the largest aperture cross section. The laser beam emitted from the light source 21 is denoted as a tow-dot chain line in FIGS. 1 and 2. The dimension d3 of the embodiment is selected to be a diameter of around 2 mm, and the dimension d4 is selected to be a diameter of around 1.2 mm.

In the embodiment, a taper degree of the paper portion 35 can be obtained by a calculation in which the difference between the dimension d3 and the dimension d1 is divided by the height dimension h2, that is, (d3−d1)/h2. In the embodiment, the height dimension h2, the dimension d1, and the dimension d3 are respectively defined so that the taper degree is around 0.67. The taper degree is preferably selected to be substantially a range from 0.6 or more to less than 0.8.

In the plate 32, a cross-sectional shape of the part 38 of the taper portion 35 having the largest aperture cross section is formed in any one of a circular shape, an elliptical shape, and a long hole shape.

In the embodiment, the aperture wall 33 of the optical path changing section 12 is provided with the flat portion 34 in addition to the taper portion 35. Accordingly, it is possible to individually set the dimension d1 of the part 37 of the taper portion 35 having the smallest aperture cross section, and the taper degree of the taper portion 35, thus facilitating fine adjustment of dimensions using a metal mold or the like when manufacturing the optical path changing section 12. Accordingly, it is possible to improve a manufacturing yield of the optical path changing section 12.

The prism 13 provides a reflectance of 0% and a transmittance of 100% with respect to a laser beam emitted from the light source 21. Also, a laser beam reflected by the optical recording medium 28 is converted with respect to a polarization direction by the effect of the quarter wavelength plate 15 as described later. The prism 13 provides a reflectance of 100% and a transmittance of 0% for the laser beam reflected by the optical recording medium 28 and converted with respect to the polarization direction. The prism 13 is a polarizing prism in which a reflective film having such properties of a reflectance and a transmittance is provided on a slope slanting at a 45-degree angle to the optical axis L1. Therefore, the prism 13 transmits 100% of a laser beam emitted from the light source 21, and reflects 100% of a laser beam reflected by the optical recording medium 28 and changed with respect to the polarization direction.

The collimating lens 14 converts a laser beam emitted from the light source 21 and transmitted through the optical path changing section 12 and the prism 13, into parallel light. The quarter wavelength plate (hereinafter may be referred to as a "λ/4 plate") 15 converts linearly-polarized incident light into circularly-polarized light and emits the circularly-polarized light, and converts circularly-polarized incident light into linearly-polarized light and emits the linearly-polarized light. The objective lens 16 as a light-condensing section condenses the laser beam transmitted through the λ/4 plate 15 on an information recording surface of the optical recording medium 28. In the embodiment, the prism 13, the collimating lens 14, the λ/4 plate 15, and the objective lens 16 are arranged in this order on an optical path between the optical path changing section 12 and the optical recording medium 28.

The photodetector 17 as a light-detecting section is arranged on an axis line extended in a direction perpendicular to the optical axis L1 at an interval with the prism 13, in a direction parallel to a recording layer of the optical recording medium 28 and parallel to a radial direction that is a scanning direction of tracks as a recording region. The photodetector 17 converts a laser beam which is emitted from the light 21, is reflected by the information recording surface of the optical recording medium 28, is reflected by the prism 13 as described above, and then enters the photodetector 17, into a electrical signal depending on an amount of light received. The photodetector 17 then detects a focusing error signal (abbreviated as FES), a tracking error signal (abbreviated as TES), and an information signal (abbreviated as RF) of the optical recording medium 28, based on the above-described signal. The photodetector 17 is implemented by for example a photo diode.

When the driving voltage and the driving current are supplied to the light source 21 via the lead electrode 23 provided on the stem 22, a laser beam having a predetermined wavelength range is emitted from the light source 21. The laser beam emitted from the light source 21 enters the beam splitting diffraction grating 26 of the optical substrate 25. The laser beam enters the beam splitting diffraction grating 26 is split into one main beam and two sub-beams. In the following description, the main beam and the respective sub-beams are collectively referred to merely as a "laser beam".

In the laser beam transmitted through the beam splitting diffraction grating 26, the undesired light as the laser beam out of the effective diameter and other than the laser beam to be applied for reading or recording of information from/onto the optical recording medium 28 is taken as A1 and A2. The undesired light A1, A2 is reflected into a space facing the part 37 of the taper portion 35 having the smallest aperture cross section, by the taper portion 35 formed on the aperture wall 33 which defines the aperture portion 31 of the plate 21 of the optical path changing section 12. Accordingly, the predetermined optical path of the undesired light A1, A2 passing through is changed from the predetermined optical path to another optical path.

Here, the predetermined optical path of the undesired light A1, A2 passing through is referred to as an optical path by which the laser beam to be applied for reading or recording of information from/onto the optical recording medium 28 is guided to the optical recording medium 28, and an optical path on which the prism 13, the collimating lens 14, the λ/4 plate 15, and the objective lens 16 are arranged. Therefore, the undesired lights A1, A2 do not enter the prism 13, the collimating lens 14, the λ/4 plate 15, and the objective lens 16, and thus are not condensed on the optical recording medium 28. In other words, of the laser beam that has been transmitted through the beam splitting diffraction grating 26, only the laser beam to be applied for reading or recording of information from/onto the optical recording medium 28, passes through the aperture portion 31 of the optical path changing section 12 to enter the prism 13, the collimating lens 14, the λ/4 plate 15, and the objective lens 16.

The laser beam that has passed through the aperture portion 31 of the optical path changing section 12 and has entered the prism 13 achieves 100% transmission through the prism 13, and then enters the collimating lens 14 to be transformed into parallel light. The laser beam that has been transformed into the parallel light by the collimating lens 14 enters the λ/4 plate 15. A laser beam emitted from the CD semiconductor laser element or the DVD semiconductor laser element as the light source 21 is a linearly-polarized laser beam, and the linearly-polarized laser beam is converted to a circularly-polarized laser beam when entering the λ/4 plate 15.

The circularly-polarized laser beam enters the objective lens 16 to be condensed on the information recording surface of the optical recording medium 28. The laser beam reflected on the information recording surface of the optical recording medium 28 is transmitted through the objective lens 16 and then transmitted though the λ/4 plate 15 once again, and thereby transformed into the linearly-polarized light having a polarization direction perpendicular to a polarization direction of the original laser beam. The linearly-polarized laser beam is transmitted through the collimating lens 14, and 100% of the transmitted laser beam is then reflected by the prism 13 in a direction parallel to the radial direction. The laser beam reflected by the prism 13 enters a predetermined light-receiving region of the photodetector 17.

According to the embodiment as described above, on an optical path between the light source 21 and the objective lens 16, in more detail, on the optical path between the laser unit 11 and the prism 13, there is provided the optical path changing section 12 for changing the predetermined optical path of the undesired light, which is the laser beam out of the effective diameter and other than the laser beam to be applied for reading or recording of information from/onto the optical recording medium 28, of the laser beam emitted from the light source 21, from the predetermined optical path to another optical path. The optical path changing section 12 includes the plate 32 in which the aperture portion 31 for allowing a laser beam emitted from the light source 21 to pass through is formed. The aperture wall 33 which defines the aperture portion 31 of the plate 32 includes the taper portion 35 which is formed in a tapered-shape and slants so as to come close to the optical axis L1 of the light source 21 in association with movement in one direction of the X axis direction as a laser beam outgoing direction.

Therefore, the undesired light A1, A2 of the laser beam emitted from the light source 21 is reflected by the optical path changing section 12, specifically, by the taper portion 35 of the aperture wall 33 which defines the aperture portion 31 of the plate 32, resulting that the predetermined optical path of the undesired light A1, A2 passing through is changed from the predetermined optical path to another optical path. Accordingly, the undesired light A1, A2 can be prevented from entering the photodetector 17 by being reflected by for example the optical recording medium 28.

Further, according to the embodiment, in the plate bode 32, the dimension d1 of the part 37 of the taper portion 35 having the smallest aperture cross section is smaller than the dimension d2 of a cross section of a laser beam, the cross section of the laser beam being taken on a virtual plane perpendicular to the X axis direction at a position where the laser beam emitted from the light source 21 has reached the aperture wall 33. Accordingly, in the laser beam emitted from the light source 21, the laser beam to be applied for reading or recording of information from/onto the optical recording medium 28 is directly passed through the aperture portion 31 of the plate 32, and only the undesired light A1, A2 other than the above-mentioned laser beam is reflected by the taper portion 35 of the aperture wall 31 of the aperture portion 33. Accordingly, the predetermined optical path of the undesired light passing through can be certainly changed from the predetermined optical path to another optical path. Accordingly, the undesired light A1, A2 can be prevented from entering the photodetector 17 by being reflected by for example the optical recording medium 28.

Further, according to the embodiment, in the plate 32, the dimension d3 of the part 38 of the taper portion 35 having the largest aperture cross section is larger than the dimension d4 of a cross section of a laser beam emitted from the light source 21, the cross section of the laser beam being taken on a virtual plane perpendicular to the X axis direction at a position corresponding to the part 38 of the taper portion 35 having the largest aperture cross section. Accordingly, the entire laser beam emitted from the light source 21 can be guided to the aperture portion 31 of the plate 32, and the laser beam to be applied for reading or recording of information from/onto the optical recording medium 28 in the laser beam emitted from the light source 21, is directly passed through the aperture portion 31 of the plate 32, and only the undesired light A1, A2 other than the above-mentioned laser beam is reflected by the taper portion 35 of the aperture wall 31 which defines the aperture portion 33. Accordingly, the predetermined optical path of the undesired light passing through can be certainly changed from the predetermined optical path to another optical path. Accordingly, the undesired light A1, A2 can be prevented from entering the photodetector 17 by being reflected by for example the optical recording medium 28.

Further, according to the embodiment, in the plate 32, the aperture wall 33 which defines the aperture portion 31 includes a function for reflecting the undesired light A1, A2 into a space facing the part 37 of the taper portion 35 having the smallest aperture cross section. Therefore, the undesired light A1, A2 in the laser beam emitted from the light source 21 is reflected into a space facing the part 37 of the taper portion 35 having the smallest aperture cross section, by the taper portion 35 of the aperture wall 33 in the plate 32. Accordingly, the undesired light A1, A2 can be certainly prevented from entering the photodetector 17 by being reflected by for example the optical recording medium 28.

Further, according to the embodiment, in the plate 32, the cross-sectional shape of the part 38 of the taper portion 35 having the largest aperture cross section can be implemented by any one of a circular shape, an elliptical shape, and a long hole shape. Therefore, the cross-sectional shape is formed in any one of a circular shape, an elliptical shape, and a long hole shape, depending on a radiation angle of a laser beam emitted from the light source 21. Therefore, only the undesired light A1, A2 in the laser beam emitted from the light source 21 is reflected by the taper portion 35 of the aperture wall 33 which defines the aperture portion 31. Accordingly, the predetermined optical path of the undesired light passing through can be certainly changed from the predetermined optical path to another optical path. Accordingly, the undesired light A1, A2 can be certainly prevented from entering the photodetector 17 by being reflected by, for example, the optical recording medium 28.

Further, according to the embodiment, there are provided two light sources 21, each of which emits a laser beam having a wavelength range, the respective wavelength being different from each other. Specifically, two light sources 21 are the CD semiconductor laser element for emitting a laser beam having for example an infrared wavelength of 780 nm as the predetermined wavelength range, and the DVD semiconductor laser element for emitting a laser beam having for example a red wavelength of 650 nm as the predetermined wavelength range.

As described in the embodiment, even when the CD semiconductor laser element and the DVD semiconductor laser element are provided as the light source 21, in the laser beam emitted from each of the semiconductor elements, the laser beam to be applied for reading or recording of information from/onto the optical recording medium 28 is directly passed through the aperture portion 31 of the plate 32, and only the undesired light A1, A2 other than the laser beam is reflected by the taper portion 35 of the aperture wall 33 which defines the aperture portion 31, and thereby the predetermined optical path of the undesired light A1, A2 passing through can be certainly changed from the predetermined optical path to another optical path. Accordingly, the undesired light A1, A2 can be certainly prevented from entering the photodetector 17 by being reflected by for example the optical recording medium 28.

As described above, the undesired light A1, A2 can be certainly prevented from entering the photodetector 17 by being reflected by for example the optical recording medium 28. Therefore, it is possible to detect correct signals, for example the focusing error signal, the tracking error signal, and the information signal, based on a detected result of the photodetector 17 for detecting a laser beam that has been reflected by the optical recording medium 28. Accordingly, it is possible to carry out correct reading from information recorded in the optical recording medium 28 and correct recording of information onto the optical recording medium 28.

Further, according to the embodiment, as described above, a taper shape of the taper portion 35 in the aperture wall 33 which defines the aperture portion 31 is defined to prevent the undesired light A1, A2 from entering the photodetector 17. Therefore, the configuration of the optical pickup apparatus 10 can be simplified, compared with the related art requiring high positioning accuracy between the aperture limiting means and the light source. Therefore, a cycle time to manufacture the optical pickup apparatus 10 can be reduced. Accordingly, it is possible to achieve mass-production of the optical pickup apparatus 10.

Further, according to the embodiment, the plate 32 can be implemented by a resin material. Therefore, it is possible to achieve further reductions in weight and manufacturing costs for the optical pickup apparatus 10, compared with a case in which the plate 32 is implemented by a metal material.

Further, according to the embodiment, the optical path changing section 12 is integrally constituted with a sliding base 29 corresponding to a housing supporting the main body of the optical pickup apparatus. Accordingly, it is possible to reduce a number of optical components and a number of assembling processes thereof to be used for manufacturing the optical pickup apparatus 10, simplify optical adjustment work such as an optical axis adjustment, and assembling work, and thereby improve productivity of the optical pickup apparatus 10. In addition, by reducing a number of the optical components, it is possible to achieve further reductions in weight and manufacturing costs for the optical pickup apparatus 10.

Furthermore, even after adjustments for a position of the light source 21 from the objective lens 16, or the like, it is possible to detect correct signals, for example the focusing error signal, the tracking error signal, and the information signal, based on a detected result of the photodetector 17 for detecting a laser beam that has been emitted from each light source and reflected by the optical recording medium 28. Accordingly, it is possible to carry out correct reading from information recorded in the optical recording medium 28 and correct recording of information onto the optical recording medium 28.

Figure 3:
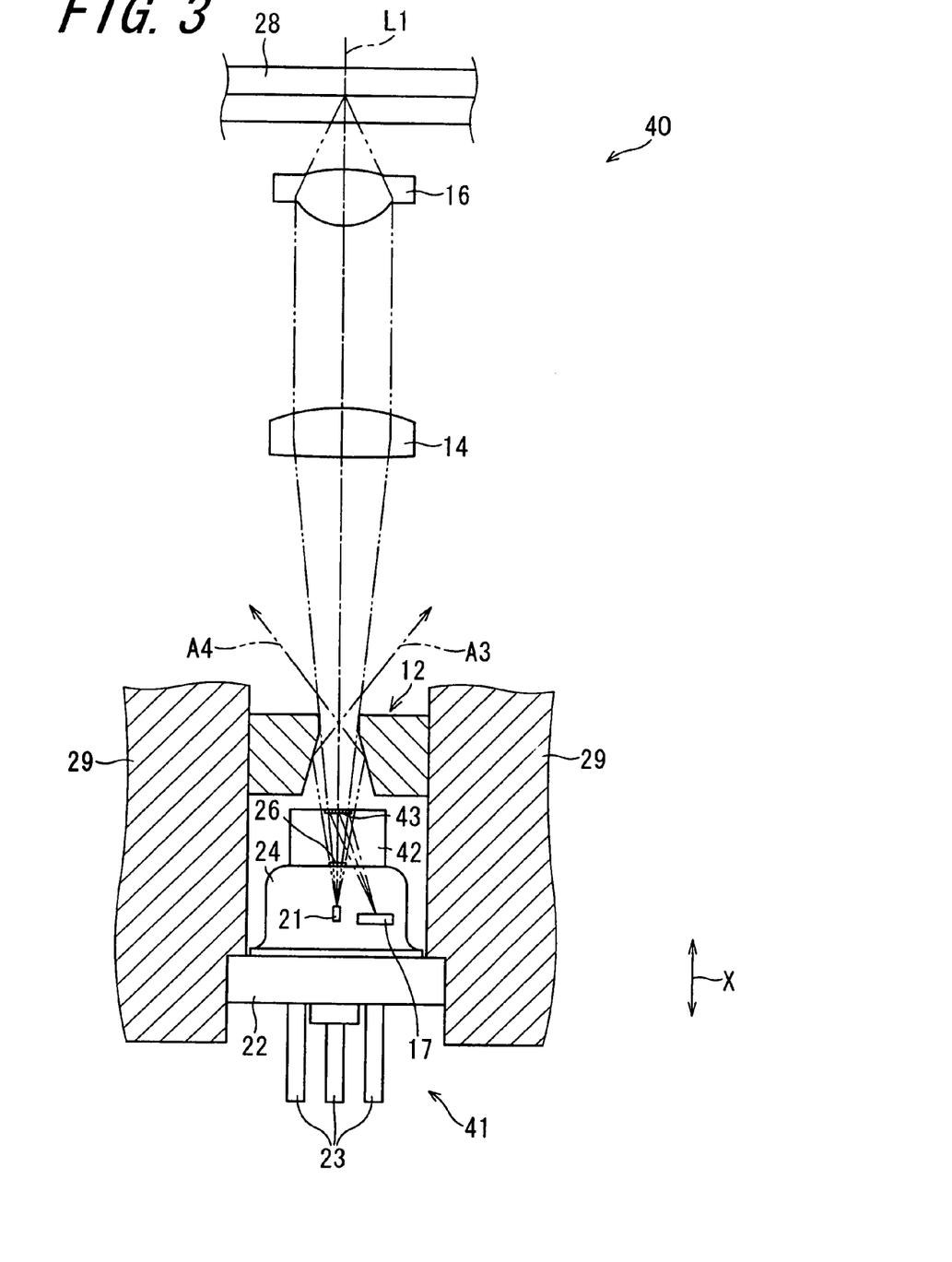
FIG. 3 is a view showing the configuration of an optical pickup apparatus according to another embodiment of the invention.
Figure 4:
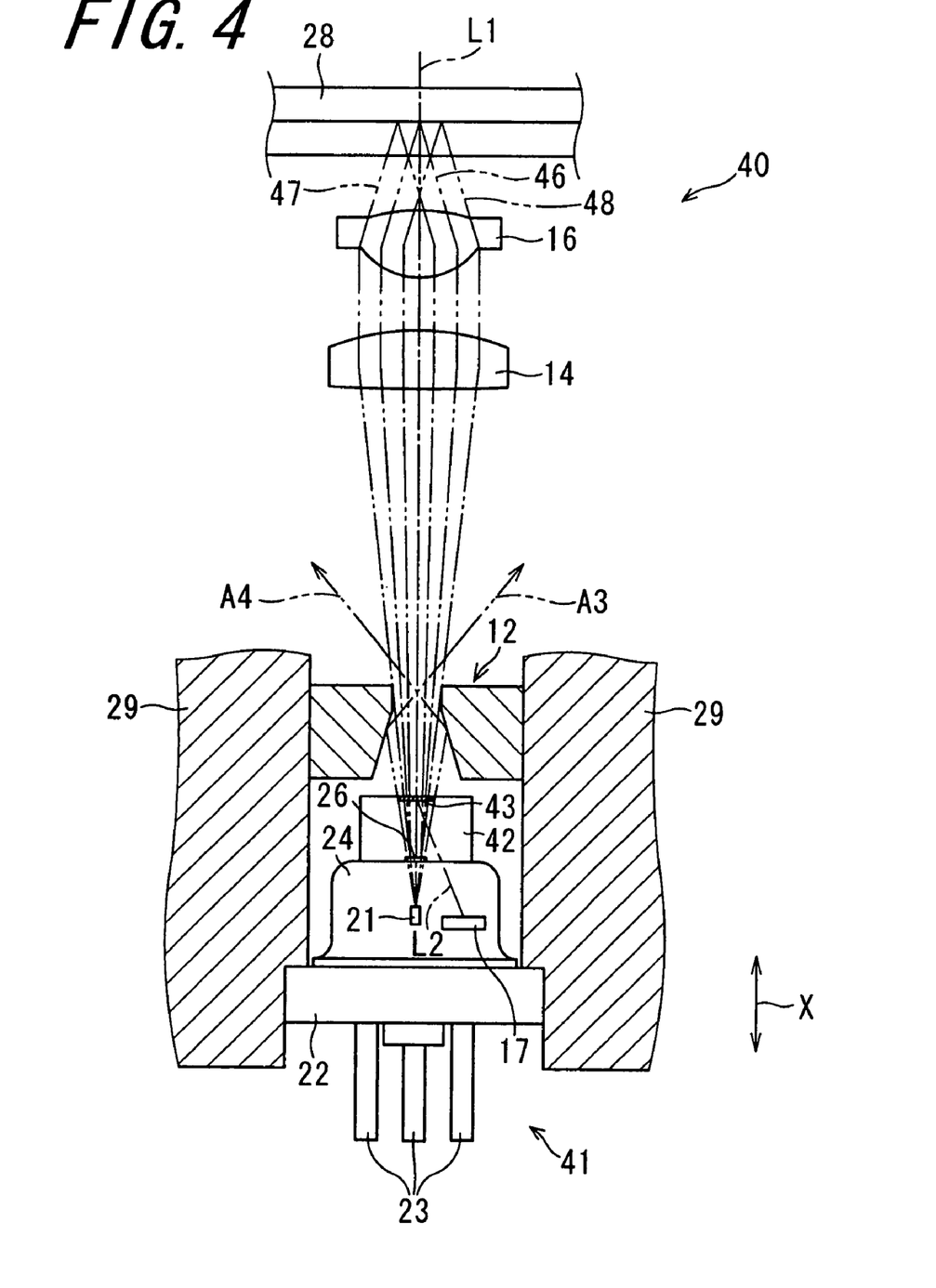
FIG. 4 is a view showing zero-order light beam and +/− first-order diffracted light beams which are split by a beam splitting diffraction grating of the optical pickup apparatus of FIG. 3, and then condensed on an optical recording medium.
Figure 5:
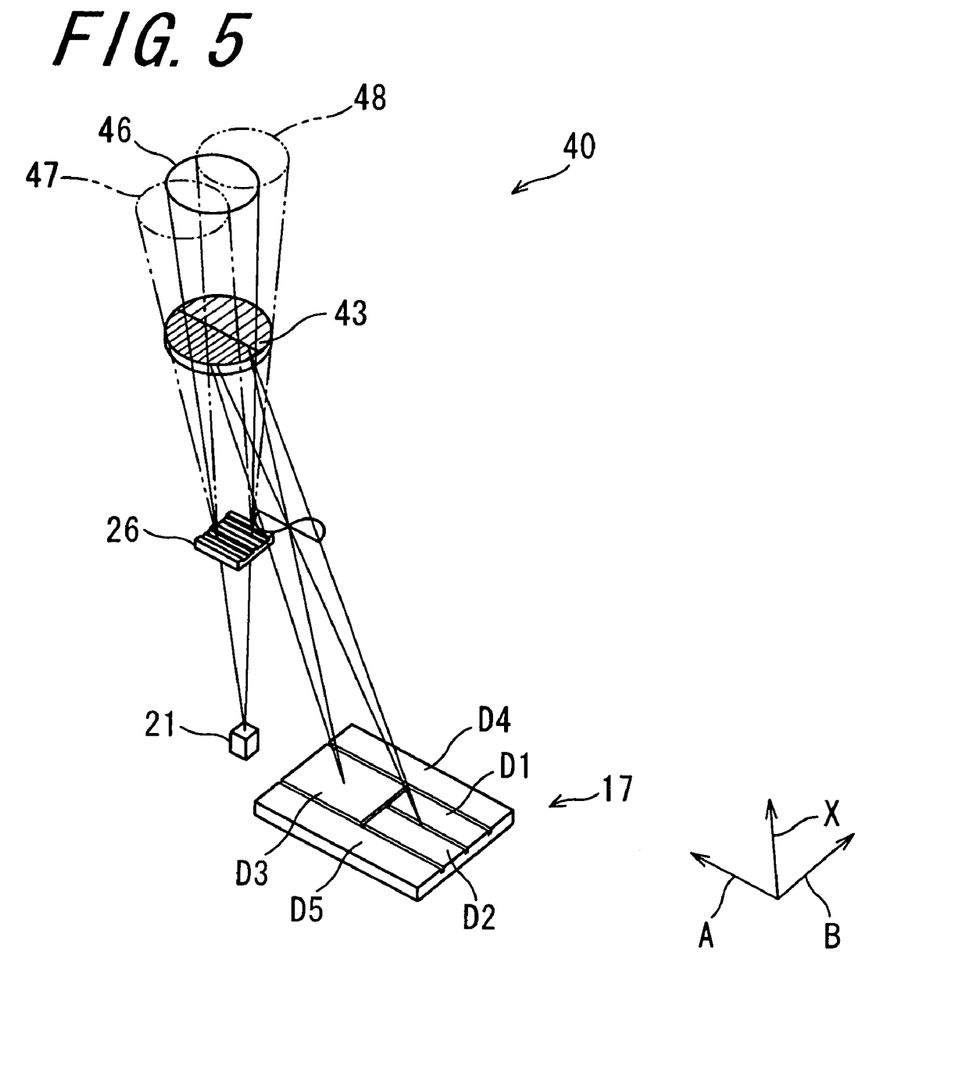
FIG. 5 is a simplified perspective view illustrating the configuration of the optical pickup apparatus.

FIG. 3 is a view showing the configuration of an optical pickup apparatus 40 according to another embodiment of the invention. FIG. 4 is a view showing zero-order light beam 46 and +/− first-order diffracted light beams 47, 48 which are split by the beam splitting diffraction grating 26 of the optical pickup apparatus 40 of FIG. 3, and then condensed on the optical recording medium 28. FIG. 5 is a simplified perspective view illustrating the configuration of the optical pickup apparatus 40. The optical pickup apparatus 40 of the embodiment has configurations similar to those of the optical pickup apparatus 40 of the embodiment shown in FIG. 1. Therefore, only portions that are not identical to the embodiment of FIG. 1 will be described, and portions corresponding to the embodiment of FIG. 1 will be denoted by the same reference numerals and the common descriptions will be omitted in order to prevent overlapped descriptions. The X axis direction is denoted by "X" in FIGS. 3 to 5.

The optical pickup apparatus 40 comprises a laser unit 41, the optical path changing section 12, the collimating lens 14, and the objective lens 16. The laser unit 41 of the embodiment includes the light source 21, the photodetector 17, the stem 22, the lead electrodes 23, the cap 24, and an optical substrate 42. The optical substrate 42 includes the beam splitting diffraction grating 26, and a hologram diffraction grating 43.

The cap 24 is a sealing member for sealing the light source 21 and the photodetector 17 to prevent physical contact between the light source 21 and the photodetector 17, and the outside, and is attached to one surface of the stem 22 in a thickness direction thereof, in other words, on a surface of the stem 22 on one side in the X axis direction. Accordingly, the light source 21 and the photodetector 17 are sealed by the stem 22 and the cap 24. The lead electrodes 23 are provided so as to be projected from the other surface of the stem 22 in the thickness direction thereof, in other words, a surface of the stem 22 on the other side in the X axis direction, on the other side in the X axis direction that is the other side in the thickness direction of the stem 22, and are electrically connected to the light source 21 and the photodetector 17.

The beam splitting diffraction grating 26 is formed on the other surface of the optical substrate 42 in a thickness direction thereof, in other words, on a surface of the optical substrate 42 on the other side in the X axis direction, and the hologram diffraction grating 43 is formed on the other surface of the optical substrate 42 in the thickness direction thereof, in other words, on a surface of the optical substrate 42 on one side in the X axis direction. The hologram diffraction grating 43 is formed in an approximately circular form, viewed from one side in the X axis direction, as shown in FIG. 5. The hologram diffraction grating 43 has a diffraction property that makes an incident laser beam diffracted. The hologram diffraction grating 43 uses such diffraction property to diffract a laser beam-that has been emitted from the light source 21, is reflected by the information recording surface of the optical recording medium 28, and then enters the hologram diffraction grating 43, in a predetermined direction toward the photodetector 17.

In more detail, the hologram diffraction grating 43 has two hologram pattern regions. Each hologram pattern region is formed in a semicircular form, viewed from one side in the X axis direction. Grooves of a hologram pattern in each hologram pattern region are defined so as to be different in width, pitch, and depth, in other words, so as to obtain a predetermined diffraction efficiency. Accordingly, in the embodiment, the hologram diffraction grating 43 is adapted to allow the laser beam diffracted in each hologram pattern region to enter a predetermined light-receiving region of the photodetector 17.

The photodetector 17 converts a laser beam that is emitted from the light source 21, is reflected by the information recording surface of the optical recording medium 28, is diffracted by the hologram diffraction grating 43, and then enters the photodetector 17, into an electrical signal depending on an amount of light received, to detect the FES, TES, and RF based on the electrical signal.

The photodetector 17 is formed in a rectangular and tabular form. In the photodetector 17, a direction parallel to a plane including the optical axis L1, and an optical axis L2 of a laser beam that has been reflected by the optical recording axis 28 and diffracted by the hologram diffraction grating 43, and perpendicular to the X axis direction, is taken as an "A" direction. A direction perpendicular to the "A" direction, and perpendicular to the X axis direction, is taken as a "B" direction. The "A" direction, the "B" direction, and the X axis direction are at right angles to one another to constitute a three-dimensional rectangular coordinate system. The photodetector 17 is arranged on an optical path of diffracted light beams diffracted by the hologram diffraction grating 43, adjacent to the light source 21, in a direction parallel to the "A" direction and perpendicular to the optical axis L1.

The photodetector 17 has light-receiving regions in a rectangular form having a side parallel to the "A" direction and a side parallel to the "B" direction. In the embodiment, the photodetector 17 has five light-receiving regions D1, D2, D3, D4, and D5. The photodetector 17 is roughly divided into three regions in the "B" direction, by region dividing lines extended in the "A" direction. Of the three regions, a region to one end in the "B" direction is taken as a fourth light-receiving region D4, and a region to the other end in the "B" direction is taken as a fifth light-receiving region D5.

The middle region of the three regions is divided into two regions by a region dividing line extended in the "B" direction. Of the two regions, one region to the light source 21 in the "A" direction is taken as a third light-receiving region D3. Of the two regions, the other region adjacent to the third light-receiving region D3 in the "A" direction is divided into another two regions by a region dividing line extended in the "A" direction. Of the two regions formed by being divided by the region dividing line extended in the "A" direction, a region adjacent to the fourth light-receiving region D4 is taken as a first light-receiving region D1, and a region adjacent to the fifth light-receiving region D5 is taken as a second light-receiving region D2.

The optical path changing section 12 of the embodiment is arranged on an optical path between the laser unit 41 and the objective lens 16, in more detail, on the optical path between the laser unit 41 and the collimating lens 14.

When a driving current and a driving voltage are supplied to the light source 21 via the lead electrode 23 provided on the stem 22, a laser beam having a predetermined wavelength range is emitted. The laser beam emitted from the light source 21 enters the beam splitting diffraction grating 26 of the optical substrate 42. The laser beam enters the beam splitting diffraction grating 26 is split into the zero-order light beam 46 as one main beam, and the + first-order diffracted light beam 47 and the − first-order diffracted light beam 48 as two sub-beams. In the following description, the + first-order diffracted light beam 47 and the − first-order diffracted light beam 48 may be collectively referred to as "+/− first-order diffracted light beams 47, 48".

The zero-order light beam 46 and the +/− first-order diffracted light beams 47, 48 that has been transmitted through the beam splitting diffraction grating 26 enters each of the hologram pattern regions of the hologram diffraction grating 43. The zero-order light beam 46 and the +/− first-order diffracted light beams 47, 48 that have entered each of the hologram pattern regions is diffracted in a predetermined diffraction direction.

In the embodiment, to allow the zero-order light beam 46 and the +/− first-order diffracted light beams 47, 48 that have been transmitted through the hologram diffraction grating 43 to totally pass through the aperture portion 31 of the optical path changing section 12, there is defined, in the plate 32, the dimension d1 of the part 37 of the taper portion 35 having the smallest aperture cross section; and the dimension d4 of a cross section of a laser beam emitted from the light source 21, the cross section of the laser beam being taken on a virtual plane perpendicular to the X axis direction as a direction parallel to the optical axis L1 at a position corresponding to the part 38 of the taper portion 35 having the largest aperture cross section.

In the embodiment, the dimension d1 is selected to be a diameter of around 1 mm, and the dimension d4 is selected to be a diameter of around 1.2 mm.

Accordingly, undesired light A3, A4, which is the laser beam out of the effective diameter and other than the laser beam to be applied for reading or recording of information from/onto the optical recording medium 28, in the laser beam emitted from the light source 21, is reflected into a space facing the part 37 of the taper portion 35 having the smallest aperture cross section, by the taper portion 35 formed on the aperture wall 33 which defines the aperture portion 31 of the plate 32 of the optical path changing section 12.

Accordingly, a predetermined optical path of the undesired light A3, A4 passing through is changed from the predetermined optical path to another optical path. Here, the predetermined optical path of the undesired light A3, A4 passing through, represents an optical path by which a laser beam to be applied for reading or recording of information from/onto the optical recording medium 28 is guided to the optical recording medium 28, and the optical path on which the collimating lens 14 and the objective lens 16 are arranged.

Therefore, the undesired light A3, A4 does not enter the collimating lens 14 and the objective lens 16, and thus is not condensed on the optical recording medium 28. In other words, in the laser beam that has been transmitted through the hologram diffraction grating 43, only the laser beam to be applied for reading or recording of information from/onto the optical recording medium 28, passes through the aperture portion 31 of the optical path changing section 12 and then enter the collimating lens 14 and the objective lens 16.

The zero-order light beam 46 and the +/− first-order diffracted light beams 47, 48 that have passed through the aperture portion 31 of the optical path changing section 12 enters the collimating lens 14 to be transformed into parallel light. The zero-order light beam 46 and the +/− first-order diffracted light beams 47, 48 that have been transformed into the parallel light by the collimating lens 14 is transmitted through the objective lens 16 to be condensed on the information recording surface of the optical recording medium 28. The zero-order light beam 46 and the +/− first-order diffracted light beams 47, 48 that have been reflected by the information recording surface of the optical recording medium 28 is transmitted through the objective lens 16 and the collimating lens 14 to be transformed into the parallel light, and the parallel light passes through the aperture portion 31 of the optical path changing section 12 to enters the hologram diffraction grating 43 of the optical substrate 42.

The zero-order light beam 46 that has entered the hologram diffraction grating 43 is split into two laser beams having a semicircular shape by each of the hologram pattern regions. One of the laser beams enters the region dividing line for dividing into the first light-receiving region D1 and the second light-receiving region D2 in the photodetector 17, and the other one of the laser beams enters the third light-receiving region D3 of the photodetector 17.

The + first-order light 47 that has entered the hologram diffraction grating 43 is split into two laser beams having a semicircular shape by each of the hologram pattern regions. The two split laser beams both enter the common light-receiving region of the photodetector 17, that is, the fifth light-receiving region D5 in the embodiment.

The first-order light 48 that has entered the hologram diffraction grating 43 is split into two laser beams having a semicircular shape by each of the hologram pattern regions. The two split laser beams both enter the common light-receiving region of the photodetector 17, that is, the fourth light-receiving region D4 in the embodiment.

Signals outputted from the respective light-receiving regions D1 to D5 of the photodetector 17 are taken as S(D1), S(D2), S(D3), D(D4), and S(D5) respectively. The FES, TES, and RF are obtained by the following calculations:

$$FES = S(D1) - S(D2) \quad (1)$$

$$TES = S(D4) - S(D5) \quad (2)$$

$$RF = S(D1) + S(D2) + S(D3) \quad (3)$$

As described above, according to the embodiment, on the optical path between the light source 21 and the objective lens 16, in more detail, on the optical path between the laser unit 41 and the collimating lens 14, there is provided the optical path changing section 12 for changing the predetermined optical path of the undesired light, which is the laser beam out of the effective diameter and other than the laser beam to be applied for reading or recording of information from/onto the optical recording medium 28, in the laser beam emitted from the light source 21, from the predetermined optical path to another optical path.

Therefore, the undesired light A3, A4 of the laser beam emitted from the light source 21 is reflected by the optical path changing section 12, specifically, by the taper portion 35 of the aperture wall 33 which defines the aperture portion 31 in the plate 32, resulting that the predetermined optical path of the undesired light A3, A4 passing through is changed from the predetermined optical path to another optical path. Accordingly, the undesired light A3, A4 can be prevented from entering the photodetector 17 by being reflected by for example the optical recording medium 28.

Furthermore, according to the embodiment, in the plate 32, the dimension d1 of the part 37 of the taper portion 35 having the smallest aperture cross section is formed smaller than the dimension d2 of a cross section of a laser beam, the cross section being taken on a virtual plane perpendicular to the X axis direction at a position where the laser beam emitted from the light source 21 has reached the aperture wall. Accordingly, in the laser beam emitted from the light source, the laser beam to be applied for reading or recording of information from/onto the optical recording medium 28 is directly passed through the aperture portion 31 of the plate 32, and only the undesired light A3, A4 other than the above-mentioned laser beam is reflected by the taper portion 35 of the aperture wall 31 which defines the aperture portion 33. Accordingly, the predetermined optical path of the undesired light A3, A4 passing through can be certainly changed from the predetermined optical path to another optical path. Accordingly, the undesired light A3, A4 can be prevented from entering the photodetector 17 by being reflected by for example the optical recording medium 28.

Further, according to the embodiment, in the plate 32, the dimension d3 of the part 38 of the taper portion 35 having the largest aperture cross section is formed larger than the dimension d4 of a cross section of a laser beam emitted from the light source 21, the cross section of the laser beam being taken on a virtual plane perpendicular to the X axis direction at a position corresponding to the part of the taper portion having the largest aperture cross section.. Accordingly, the entire laser beam emitted from the light source 21 can be guided to the aperture portion 31 of the plate 32, and the laser beam to be applied for reading or recording of information from/onto the optical recording medium 28, in the laser beam emitted from the light source 21, is directly passed through the aperture portion 31 of the plate 32, and only the undesired light A3, A4 other than the above-mentioned laser beam is reflected by the taper portion 35 of the aperture wall 31 which defines the aperture portion 33. Accordingly, the predetermined optical path of the undesired light A3, A4 passing through can be certainly changed from the predetermined optical path to another optical path. Accordingly, the undesired light A3, A4 can be prevented from entering the photodetector 17 by being reflected by for example the optical recording medium 28.

Further, according to the embodiment, the aperture wall 33 which defines the aperture portion 31 of the plate 32 includes a function for reflecting the undesired light A3, A4 into a space facing the part 37 of the taper portion 35 having the smallest aperture cross section. Therefore, the undesired light A3, A4 in the laser beam emitted from the light source 21 is reflected into a space facing the part 37 of the taper portion 35 having the smallest aperture cross section, by the taper portion 35 of the aperture wall 33 in the plate 32. Accordingly, the undesired light A3, A4 can be certainly prevented from entering the photodetector 17 by being reflected by for example the optical recording medium 28.

Further, according to the embodiment, in the plate 32, the cross-sectional shape of the part of the taper portion 35 having the largest aperture cross section can be implemented by any one of a circular shape, an elliptical shape, and a long hole shape. Therefore, the cross-sectional shape is formed in any one of a circular shape, an elliptical shape, and a long hole shape, depending on a radiation angle of the laser beam emitted from the light source 21. Therefore, only the undesired light A3, A4 in the laser beam emitted from the light source 21 is reflected by the taper portion 35 of the aperture wall 33 which defines the aperture portion 31. Accordingly, the predetermined optical path of the undesired light A3, A4 passing through can be certainly changed from the predetermined optical path to another optical path. Accordingly, the undesired light A3, A4 can be certainly prevented from entering the photodetector 17 by being reflected by for example the optical recording medium 28.

Further, according to the embodiment, there are provided two or more light sources 21, each emitting a laser beam having a different wavelength range, specifically, the CD semiconductor laser element emitting a laser beam having an infrared wavelength of for example 780 nm as a predetermined wavelength range, and the DVD semiconductor laser element emitting a laser beam having a red wavelength of for example 650 nm as a predetermined wavelength range.

As described in the embodiment, even when the CD semiconductor laser element and the DVD semiconductor laser element are provided as the light source 21, in the laser beam emitted from each of the semiconductor elements, the laser beam to be applied for reading or recording of information from/onto the optical recording medium 28 is directly passed through the aperture portion 31 of the plate 32, and only the undesired light A3, A4 other than the laser beam is reflected by the taper portion 35 of the aperture wall 33 which defines the aperture portion 31, and thereby the predetermined optical path of the undesired light A3, A4 passing through can be certainly changed from the predetermined optical path to another optical path. Accordingly, the undesired light A3, A4 can be certainly prevented from entering the photodetector 17 by being reflected by for example the optical recording medium 28.

As described above, the wanted light A3, A4 can be prevented from entering the photodetector 17 by being reflected by for example the optical recording medium 28. Therefore, it is possible to detect correct signals, for example the focusing error signal, the tracking error signal, and the information signal, based on a detected result of the photodetector 17 for detecting a laser beam that has been reflected by the optical recording medium 28. Accordingly, it is possible to carry out correct reading from information recorded in the optical recording medium 28 and correct recording of information onto the optical recording medium 28.

Further, according to the embodiment, a taper shape of the taper portion 35 of the aperture wall 33 which defines the aperture portion 31 is defined to prevent the undesired light A3, A4 from entering the photodetector 17. Therefore, the configuration of the optical pickup apparatus 40 can be simplified, compared with the related art requiring high positioning accuracy between the aperture limiting means and the light source. Therefore, a cycle time to manufacture the optical pickup apparatus 40 can be reduced. Accordingly, it is possible to achieve mass-production of the optical pickup apparatus 40.

Further, according to the embodiment, likewise with respect to the embodiment shown in FIG. 1, by implementing the plate 32 by a resin material, it is possible to achieve further reductions in weight and manufacturing costs for the optical pickup apparatus 40, compared with a case in which the plate 32 is implemented by a metal material.

Further, according to the embodiment, likewise with respect to the embodiment shown in FIG. 1, the optical path changing section 12 is integrally constituted with the sliding base 29 corresponding to a housing supporting the main body of the optical pickup apparatus. Accordingly, it is possible to reduce a number of optical components and a number of assembling processes thereof to be used for manufacturing the optical pickup apparatus 40, simplify optical adjustment work such as an optical axis adjustment, and assembling work, and thereby improve productivity of the optical pickup apparatus 40. In addition, by reducing a number of the optical components, it is possible to achieve further reductions in weight and manufacturing costs for the optical pickup apparatus 40.

Furthermore, even after adjustments for a position of the light source 21 from the objective lens 16, or the like, it is possible to detect correct signals, for example the focusing error signal, the tracking error signal, and the information signal, based on a detected result of the photodetector 17 for detecting a laser beam that has been emitted from each semiconductor laser element and reflected by the optical recording medium 28. Accordingly, it is possible to carry out correct reading from information recorded in the optical recording medium 28 and correct recording of information onto the optical recording medium 28.

The above-described embodiments are to be considered as illustrative and not restrictive, and the configurations may be therefore changed within the scope of the invention. For example, in the above-described embodiments, it has been described that the optical path changing section 12 is integrally constituted with the sliding base 29 corresponding to a housing supporting the main body of the optical pickup apparatus, but the configuration thereof is not limited to the above-described configuration. In another embodiment of the invention, the optical path changing section 12 may be integrally constituted with the laser unit 41 including the light source 21, the stem 22, the lead electrode 23, the cap 24, and the optical substrate 42 having the beam splitting diffraction grating 26. The optical path changing section 12 having the above-described configuration can also provide effects identical to those of the embodiments shown in FIGS. 1 and 3.

Moreover, in the above-described embodiments, the configurations of the optical pickup apparatuses 10, 40 comprising two or more light sources 21, each emitting a laser beam having a different wavelength range, specifically, the CD semiconductor laser element and the DVD semiconductor laser element, have been described. However, in another embodiment of the invention, the optical pickup apparatuses 10, 40 may be constituted to comprise two or more light sources, for example three light sources. In addition to the CD semiconductor laser element and the DVD semiconductor laser element, a semiconductor laser element emitting a laser beam having a blue wavelength of for example 405 nm as a predetermined wavelength range may be used as the three light sources.

Further, in the above-described embodiment of FIG. 1, the beam splitting diffraction grating 26 is formed on the other surface of the optical substrate 25 mounted on the cap 24, viewed from a thickness direction of the optical substrate 25, and is integrally constituted with the light source 21, the stem 22, the lead electrode 23, and the cap 24, to achieve the laser unit 11. However, the configuration thereof is not limited to the above-described configuration. In another embodiment of the invention, the beam splitting diffraction grating 26 may be arranged on an optical path between the cap 24 and the optical path changing section 12, as a separated body from the cap 24.

Furthermore, in the above-described embodiment of FIG. 1, the prism 13, the collimating lens 14, the λ/4 plate 15 are arranged in this order on an optical path between the optical path changing section 12 and the objective lens 16. However, the λ/4 plate 15 may be arranged on an optical path between the prism 13 and the collimating lens 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for carrying out at least either a process of reading information recorded in the optical recording medium or a process of recording information onto the optical recording medium by irradiating an optical recording medium with a laser beam, the apparatus comprising:
    a light source for emitting a laser beam having a predetermined wavelength range;
    a light-condensing section for condensing the laser beam emitted from the light source on the optical recording medium;
    a light-detecting section for detecting the laser beam emitted from the light source and reflected by the optical recording medium; and
    an optical path changing section provided on an optical path between the light source and the light-condensing section, for changing a predetermined optical path of undesired light other than the laser beam to be applied for reading or recording of information from/onto the optical recording medium, of the laser beam emitted from the light source, from the predetermined optical path to another optical path,
    wherein the optical path changing section includes a plate having an aperture portion for allowing the laser beam emitted from the light source to pass through,
    an aperture wall which defines the aperture portion of the plate includes a taper portion which is formed in a tapered-shape and slants so as to come close to an optical axis line of the light source in association with movement toward a laser beam outgoing direction and a flat portion which is parallel to the optical axis line of the light source and connects to a part of the taper portion having a smallest aperture cross section, and
    the aperture wall is configured to reflect the undesired light into a space facing the part of the taper portion having the smallest aperture cross section.

2. The optical pickup apparatus of claim 1, wherein a dimension of the part of the taper portion having the smallest aperture cross section is smaller than a dimension of a cross section of a laser beam, the cross section being taken on a virtual plane perpendicular to an optical axis line at a position where the laser beam emitted from the light source has reached the aperture wall.

3. The optical pickup apparatus of claim 1, wherein a dimension of a part of the taper portion having a largest aperture cross section is larger than a dimension of a cross section of a laser beam emitted from the light source, the cross section of the laser beam being taken on a virtual plane perpendicular to the optical axis line at a position corresponding to the part of the taper portion having the largest aperture cross section.

4. The optical pickup apparatus of claim 2, wherein two or more light sources are provided, each of which emits a laser beam having a wavelength range, the respective wavelength ranges being different from each other.

5. The optical pickup apparatus of claim 1, wherein the plate is composed of a resin material.

6. The optical pickup apparatus of claim 1, further comprising:
    a laser unit having a light source and a diffraction section for diffracting a laser beam emitted from the light source; and
    a housing for supporting a main body of the optical pickup apparatus,
    wherein the optical path changing section is integrally constituted with the laser unit or the housing.

7. The optical pickup apparatus of claim 3, wherein a cross-sectional shape of the part of the taper portion having the largest aperture cross section is any one of a circular shape, an elliptical shape, or a long hole shape.

* * * * *